Jan. 8, 1929.　　　　　　　　　　　　　　　　　1,698,363
A. C. GILBERT
MIXING APPARATUS
Filed Feb. 5, 1926　　　　2 Sheets-Sheet 2
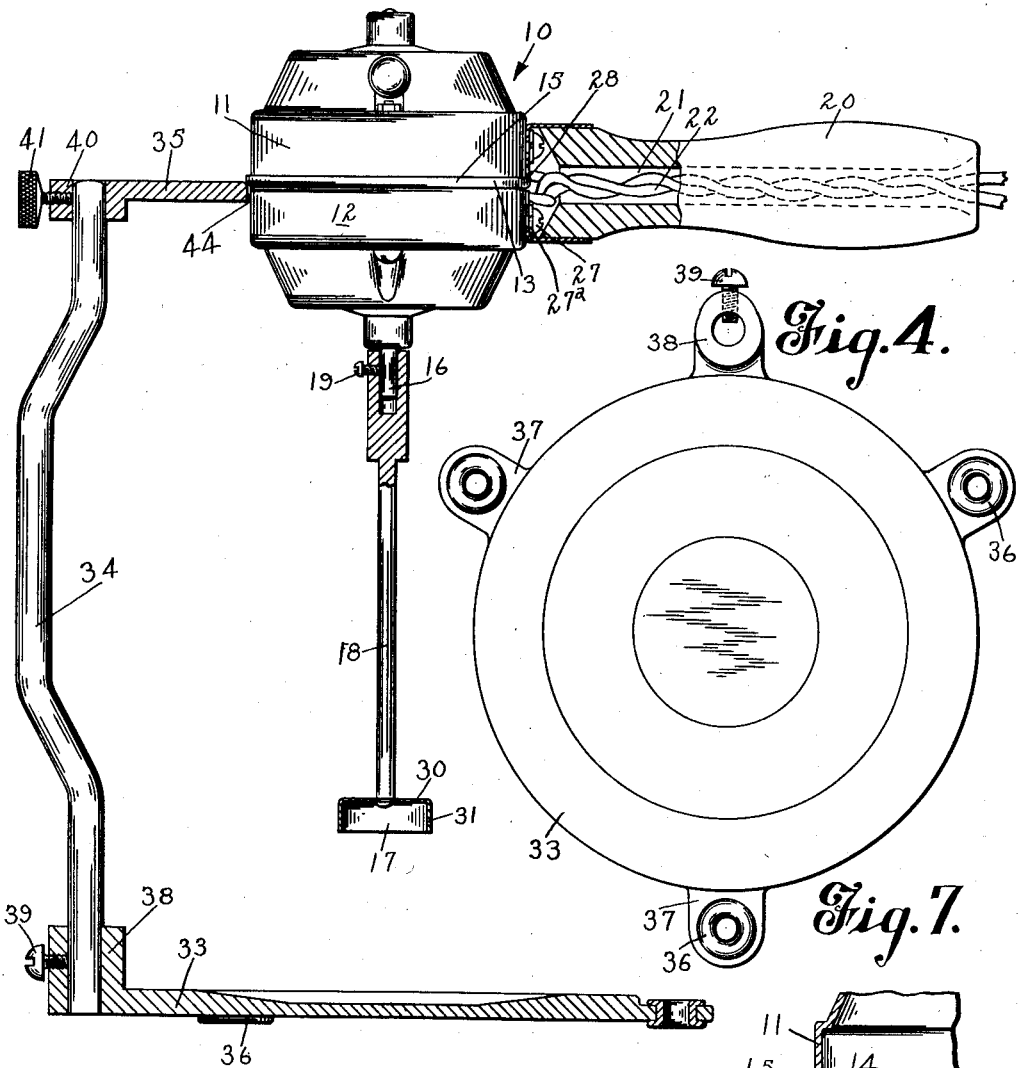
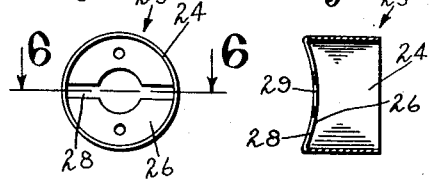
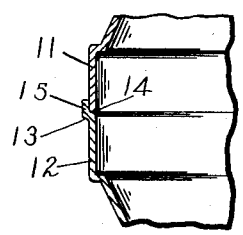
Inventor
Alfred C. Gilbert.
By Henry E. Rockwell
Attorney Patented Jan. 8, 1929.

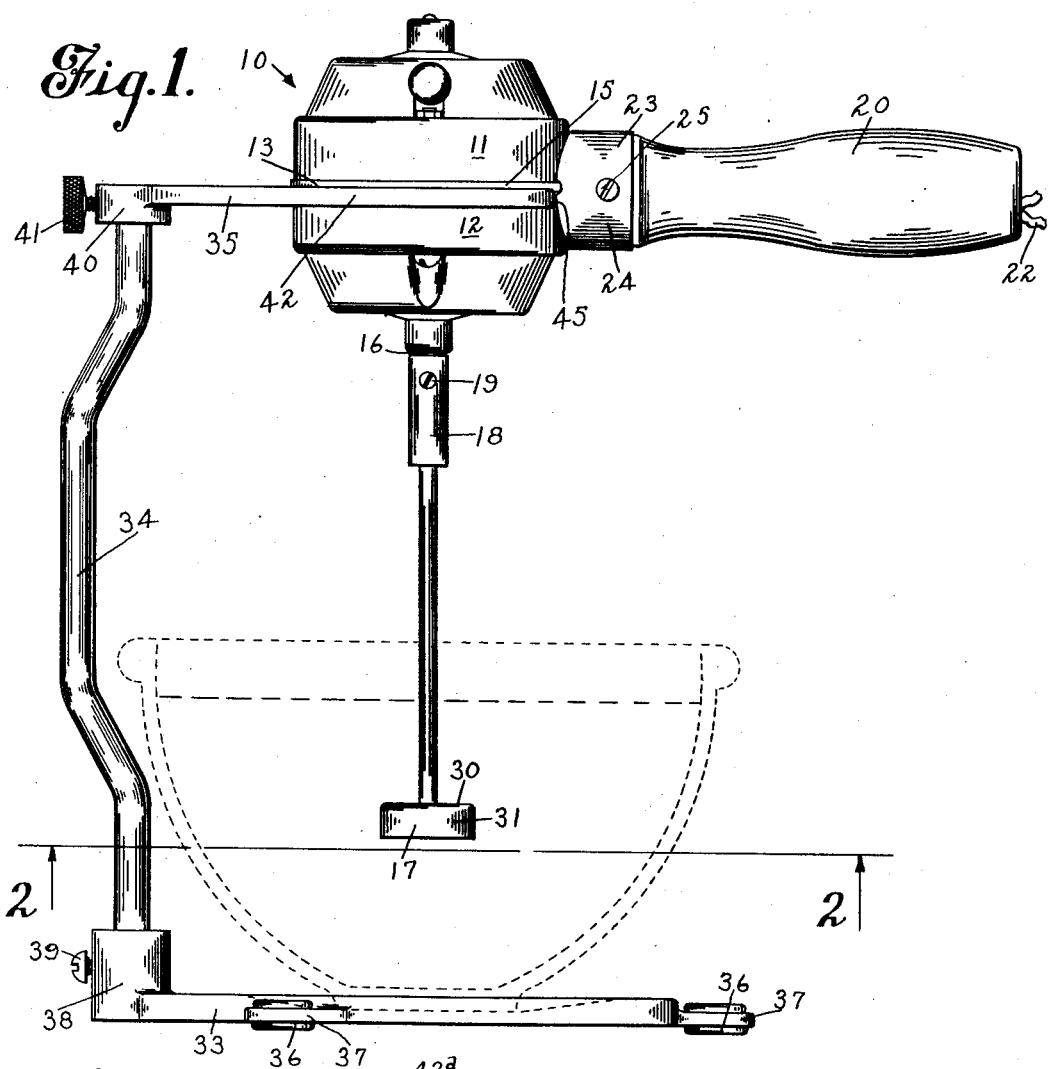

1,698,363

UNITED STATES PATENT OFFICE.

ALFRED C. GILBERT, OF NEW HAVEN, CONNECTICUT, ASSIGNOR, BY MESNE ASSIGNMENTS, TO THE A. C. GILBERT COMPANY, OF NEW HAVEN, CONNECTICUT A CORPORATION OF MARYLAND.

MIXING APPARATUS.

Application filed February 5, 1926. Serial No. 86,242.

This invention relates to apparatus for churning, beating and thoroughly mixing liquids of a semi-plastic nature, and is especially adaptable for use as a household device for mixing cake batter, frostings, cream, etc., and especially relates to such apparatus in which the beating or mixing element is rotated by an electric motor.

The primary object of this invention is to provide an inexpensive, efficient, readily portable beater which may be used either by being held in the hand of the user or supported upon a standard.

Another object of this invention is to provide improved means for supporting the beater above a container, which supporting means at the same time will retain a container in operative position relatively to the beating element.

A still further object of this invention is to provide a novel form of connecting means for securing a handle member to the remaining parts of the mixing apparatus, which will retain the parts thereof rigidly together.

To these and other ends, the invention consists in the novel features and combinations of parts to be hereinafter described and claimed.

In the accompanying drawings:

Fig. 1 is a side elevation of a mixing apparatus, embodying the features of my invention;

Fig. 2 is a sectional view on line 2—2 of Fig. 1;

Fig. 3 is a side elevation of the improved mixing apparatus, certain parts thereof being shown in section;

Fig. 4 is a plan view of a member, constituting the base of the standard used to support certain operating parts of the mixing apparatus;

Fig. 5 is a detailed end view of a connecting member for securing the handle to other parts of the mixing apparatus;

Fig. 6 is a section on line 6—6 of Fig. 5, and

Fig. 7 is a section through a portion of the casing of the electric motor preferably used with the improved mixing apparatus illustrated.

The mixing apparatus illustrated in the drawings and which embodies the features of this invention, comprises the electric motor 10, having an outwardly extending shaft member 16, to which is secured an agitating or beating member 17, by means of the stem 18, which fits over the shaft member 16, and is secured thereto by the set screw 19.

The operating parts (not shown) of the electric motor 10, in this instance, are generally similar to those disclosed in Patent No. 1,523,764 issued to A. C. Gilbert, January 20, 1925. The casing enclosing the operating parts of the motor 10, is formed by securing together two similar sheet metal halves 11 and 12, see Fig. 7. Part 12 of the casing is provided with an outwardly extending annular shoulder 13, which forms an annular seat 14 about the interior of the casing upon and against which the end periphery of the part 11 is clamped in a manner as described by the above patent. The joint between the two parts 11 and 12, is covered by an annular flange 15, which extends longitudinally over the joint from the shoulder 13, being an extension of the material forming said shoulder.

The laterally extending handle 20 on the motor member has an opening 21 therethrough to allow the passage of the motor power connecting wires 22. The handle is secured to the motor casing members 11 and 12, by means of a ferrule 23 of novel form comprising the annular flange portion 24, which is adapted to fit over the end of the handle and is secured thereto by screws 25. The base portion 26 of the ferrule is curved to fit the curvature of the casing parts 11 and 12. Screws 27, and spring washers 27$^a$ are used to secure the ferrule to the respective motor casing parts 11 and 12. A slot 28 is formed in the base portion 26 of the ferrule 23, to clear the annular shoulder 13 and flange 15 formed upon the casing part 12. An opening 29 is provided in the ferrule to allow the wires 22 to enter the motor casing from the handle 20. The handle 20 is rigidly secured to the motor and is retained against possible twisting relatively thereto by the cooperation of the edges of the slot 28 with the shoulder 13 and flange 15, the screws 25 rigidly connecting the ferrule 23 to the handle 20.

The agitating or beating member 17 is secured to the stem 18 by riveting over the end of the stem after passing the same through the base portion 30 of the member 17. An annular flange 31 depends from the base portion 30 whereby the beating member 17 is formed into substantially an inverted cup shape. By the use of an inverted cup shaped beating member of the form substantially as shown, heavy liquids or materials of a semi-plastic nature are more effectively churned or beaten when the member is rotated, whereby a more thorough mixture of the ingredients thereof is obtained. This is largely due to the action of the cup shaped member upon the liquid material. It has been found that the periphery of the beating member 17 throws the material in contact therewith outwardly in all directions by centrifugal force, which action tends to create a vacuum at this part of the material. As the material is not retained and because of atmospheric pressure upon the surface, it is continuously drawn toward the beating member both from above and below the same. By the use of an inverted cup shaped member or its equivalent, there is a tendency for a greater degree of vacuum to be formed than otherwise, the tendency being to create a vacuum within the cup shape as well as at the periphery. Being inverted, a larger amount of the material being mixed is drawn upwardly toward the beating member than is drawn downwardly, thus causing a greater flow of the material whereby the same is more thoroughly mixed.

The supporting standard illustrated in the drawings, comprises the base member 33, the upright bar 34, and a bracket 35. The base member 33 is provided with anti-slipping means comprising members 36, preferably of rubber or the like, which are retained within openings in the radially extending portions 37 of the base member. The base member 33 is dished out upon the upper face thereof to receive the base portion of a bowl or other container, the dished out portion being concentric with the axis of the beater member 17, when the same is mounted upon the support. Provision is made for the connection of the upright bar 34 with the base member 33 by an upwardly extending lug 38 which is adapted to receive the end of the bar 34. A set screw 39 secures the bar 34 within the opening in the lug 38. The bar 34 is offset outwardly intermediate its ends to allow clearance for the peripheral upper edge or side surface of a container when the same is resting upon the base 33.

The bracket 35 comprises a bar engaging part 40, adapted to receive the upper end of the bar 34, which is secured in an opening provided in the part 40 by a thumb-screw 41, and also comprises a motor member engaging part 42. The motor member engaging part 42 associated with the bracket is shown herein in the form of an annulus having a portion connecting with the bar engaging part 40, and interrupted opposite that portion to clear the handle 20 as at 43 (Fig. 2). The inner periphery 44 of the part 42 is of a diameter substantially equal to the diameter of the motor casing part 12 directly below the annular shoulder 13, whereby the part 42 is adapted to support the motor 10 by means of the cooperation of the upper surface of the part 42 and the shoulder 13. Seated within the part 42 in the manner above described, the motor 10 is retained in position above the base 33 in such a manner that the axis thereof and of the beater member 17 is concentric with the dished out portion of the base 33 and, therefore, with a container supported and located thereby. By this arrangement, the motor is detachably supported by the standard and due to the substantially complete encircling arrangement of the arms $42^a$ and $42^b$ of the part 42 about the casing part 12, the motor is firmly supported against lateral movements relatively to the standard. The interruption of the part 42 as at 43, in order that the ends of the arms $42^a$ and $42^b$ will clear the handle 20, forms opposing stops 45 which, by cooperating with the handle portion between the same prevent the rotation of the motor relatively to the standard.

It will be observed that by reason of the fact that the bar 34 is bowed outwardly, receptacles having comparatively large differences of diameter can be used with the apparatus, and that the apparatus is readily portable, especially in view of the knockdown character of the motor stand, comprising the base member or receptacle support, the bar adapted to be detachably secured thereto to extend upwardly therefrom, and the part which engages and positions the electric motor operated agitating device, which part can be readily secured by its set screw to the upper end of the bar in such a manner as to align the motor shaft with the center of the base, with the motor at the required elevation above the base or receptacle support. The base member is adapted to support a receptacle upon an inwardly located portion thereof, while anti-slipping table engaging means such as the rubber eyelets shown are disposed on the outlying portion of the base member, and the upright or bar is secured to the outlying portion of the base member. The means in which the rubber or like table engaging members are held in place comprises a support or table engaging portion which is below the level of the periphery of the dished receptacle centering and supporting portion, although this is not essential in all cases. The bar 34 detachably interconnects the motor engaging part and the receptacle supporting part, and the motor engaging part is swingable on said bar in a horizontal plane and is also vertically adjustable on said bar. The support for the receptacle is of relatively extended area so as to provide for maintaining the electric agitating device in equilibrium while the motor is rotating, and this is assisted by the lateral extension from the receptacle support of the means carrying resilient table engaging feet which are disposed in flange-like portions on the base member extending outwardly beyond the receptacle supporting member proper; and the lug for securing the upright member or bar to the base is disposed between two of the resilient table engaging feet.

It will be noted that in using my household mixer, the receptacle may be placed on the receptacle support and removed therefrom with one hand without interference by either the upright member or the supporting bracket arranged thereon. By reason of the knockdown character of the device, it may be readily packed and transported, and when it is desired to use the same it can be easily set up and the parts adjusted for the particular operating conditions, which depend inter alia upon the kind of material treated and the size and shape of the receptacle in which it is contained. The motor member can be readily placed in operative position simply by lowering it, while in a predetermined position, onto the supporting device or bracket on the upright member. The motor member can be freely lifted from the bracket, and when removed from the standard or support can be used for various other purposes. When the bracket has once been adjusted to suit certain conditions, the motor member can be removed from the bracket and returned to its initial position by lifting and lowering of the same without in any way disturbing the adjustment of the bracket; and when the motor member has been lowered onto the bracket, while in a certain angular relation with respect thereto, it is held against angular displacement, so as to prevent the turning movement of the motor member while in operation, from the effects of vibration or the like, whereby the agitating device is firmly held to its work.

While I have illustrated and described a preferred form of mixing apparatus, embodying the features of my invention, it is to be understood that the invention is not limited thereto in all of its details, but is capable of many modifications and variations which will lie within the spirit of the invention and the scope of the appended claims.

What I claim is:

1. In apparatus for mixing materials, an electric motor having a laterally extending handle secured thereto and a longitudinally extending rotatable shaft portion, a material beater operably connected to said shaft, and a standard for said motor, said standard comprising a base adapted to support a container, a member extending upwardly from said base, said member being offset intermediate its ends to clear the container, and a bracket adjustably and removably mounted upon said member for detachably engaging said motor.

2. In apparatus for mixing materials, an electric motor having a casing, said casing having an annular rib thereon, a handle for said motor extending laterally therefrom, and means to support said motor including a member having an opening therein of sufficient dimensions to pass said handle and a portion of said casing, but to prevent the ribbed portion of said casing to pass.

3. In apparatus for mixing materials, an electric motor having a casing, said casing having an annular rib thereon, a handle for said motor extending laterally therefrom, and means to support said motor including a member having an opening therein, said member encircling said motor casing below the rib thereon and being interrupted at a portion thereof to form opposing stops between which said handle is disposed to retain said motor on said support against twisting relatively to said support.

4. In apparatus for mixing materials, an electric motor having a casing, said casing having a portion projecting laterally therefrom, and a standard for said motor, including a motor engaging member, said member having a pair of arms adapted to straddle said motor casing below the projecting portion thereon, whereby said motor is supported by the cooperation of said arms with said projecting portion.

5. In apparatus for mixing materials, an electric motor having a casing, said casing having a portion projecting laterally therefrom, a handle for said motor extending laterally therefrom, and a standard for said motor, including a motor engaging member, said member having portions adapted to straddle said motor casing below the projecting portion thereon, whereby said motor is supported by the cooperation of said straddling portion and the projecting portion, the ends of said straddling portion forming opposing stops adapted to cooperate with said handle to prevent rotation of said motor relatively to said standard.

6. Mixing apparatus comprising a support for receptacles of varying diameters, an upright member secured to said support, said upright member being offset intermediate its ends to clear the periphery of any one of said receptacles, a supporting device extending horizontally from said upright member at an elevation above the top of the receptacle, and whereby any one of said receptacles may be placed on said support and removed therefrom without interference by said upright member, a motor, and a beating element depending from said motor and positioned to extend into the receptacle to stir the contents thereof when said motor and a receptacle are in operative relation to each other.

7. In material beating apparatus, a support for a receptacle, and a support for an electric motor having a depending beating element operatively connected thereto, and means connecting said supports to insure a substantial alignment of the receptacle used and the beating element, said means comprising a bar removably and adjustably secured to said motor support, and bowed outwardly intermediate its points of connection with the respective supports to permit the use of receptacles of comparatively large diameters.

8. In material beating apparatus, a support for a receptacle, and a support for an electric motor having a depending beating element operatively connected thereto, and means connecting said supports to insure a substantial alignment of the receptacle used and the beating element, said means comprising an upright member detachably secured to said receptacle support at one end and to said motor support at the other end, the ends of said upright member being substantially in alignment with each other and said member having an intermediate portion outwardly offset to permit the use of receptacles of comparatively large difference in diameters.

9. In material beating apparatus, a support for a receptacle, and a support for an electric motor having a depending beating element operatively connected thereto, said motor support having portions adapted to straddle the casing of said motor, the outer ends of said straddling portions being spaced apart, means extending from said motor casing and disposed between said spaced apart ends of said straddling portions to prevent rotation of said motor relatively to said support, and means connecting said supports to insure a substantial alignment of the receptacle used and the beating element, said means comprising a substantially vertically disposed upright removably secured to said receptacle support and to said motor support, and being offset intermediate its points of connection with the respective supports to permit the use of receptacles of comparatively large diameters.

10. A standard for removably supporting an electric motor operated agitating device, comprising a base member having a lower support engaging portion and an upper dished receptacle centering and supporting portion, an upright secured to said base, and vertically and laterally adjustable means associated with said upright to removably engage the agitating device.

11. A standard for removably supporting an electric motor operated agitating device, comprising a base member adapted to support a receptacle upon a portion thereof, with the upper face of said portion dished out to assist in centralizing such receptacle thereon, an upright secured to one side of said base member, and adjustable bracket means associated with said upright to removably support the agitating device in line with the dished out portion of said base member.

12. A standard for removably supporting an electric motor operated agitating device, comprising a base member adapted to support a receptacle upon a portion thereof, a rod secured to said base member and extending upwardly therefrom, a bracket extending laterally over said base member, said bracket having means to detachably engage the motor-operated agitating device and means to detachably and adjustably secure said bracket to said rod.

13. A standard for removably supporting an electric motor operated agitating device, comprising a base member adapted to support a receptacle upon a portion thereof, a rod extending upwardly from said base, a bracket having interconnected motor device engaging and rod engaging parts, said rod engaging part being detachably connectable to said rod and capable of vertical adjustment thereon relatively thereto, and said motor device detachably engaging said bracket.

14. In a mixing apparatus, a base member having a portion thereof arranged to support the bottom of a receptacle, and means to support an electric motor having a depending beating element, above said base member, said means being constructed to position said motor in a horizontal plane relatively to the receptacle supporting portion of said base, to thereby align the axis of said beating element with the axis of the receptacle supporting portion, and including means to permit raising and lowering of said motor relatively to said base part to thereby adjust said beating element vertically relatively to the contents of the receptacle on said base, said motor being freely detachable from the motor supporting means.

15. In a mixing apparatus, a base member, means to support an electric motor having a depending beating element, above said base member, said base member being dished out upon the upper surface thereof to engage the bottom of a receptacle, and said means being adjustable to vary the height of the motor above the receptacle and to dispose said receptacle relatively to said beating element so that the axes thereof are substantially concentric.

16. The combination with a motor member having a vertical shaft and a casing, said shaft extending downwardly beyond the casing, of a knock-down stand for said motor member having a separate removable receptacle supporting part and a motor member engaging part detachably supported on said receptacle supporting part and adjustable relatively thereto in a plurality of horizontal planes, said motor member being freely detachable from said motor member engaging part.

17. The combination with a motor member having a vertical shaft and a casing, said shaft extending downwardly beyond the casing, of a knock-down stand for said motor member having a receptacle supporting base member, a bar detachably secured to said base member and rising therefrom, and a motor positioning bracket slidable and swingable on said bar, said motor being freely detachable from said bracket.

18. The combination with an electric motor operated agitating device having a shaft and a casing, said shaft extending downwardly beyond the casing, of a stand for said device having a receptacle supporting base member, an upright member extending upwardly from said base member, and a motor positioning bracket on said upright member adjustable in a horizontal plane relatively thereto so as to center it with respect to said base member, and also adjustable vertically relatively to said upright member, said agitating device being liftable from said bracket without disturbing the adjustment of the latter.

19. The combination with an electric motor operated agitating device having a vertical shaft and a casing, said shaft extending downwardly beyond the casing, of a stand for said device having a receptacle supporting base member, an upright member extending upwardly from said base member, a motor positioning bracket on said upright member adjustable in a horizontal plane relatively thereto so as to center it with respect to said base member, and also adjustable vertically relatively to said upright member, and a device for fixing said bracket in adjusted position on said upright member, said base member being dished on its upper face to center a receptacle and being provided with an outlying portion having resilient table-engaging means.

20. A standard for removably supporting an electric agitator, comprising a base member adapted to support a receptacle upon a portion thereof, said receptacle supporting portion of said base member being round, with the upper face thereof dished out to assist in centralizing a receptacle thereon with respect to the agitator, openings formed at intervals in the remaining portion of said base member, and anti-slipping means in said openings extending below the under surface of said base member, an upright secured to said base member, and means associated with said upright to removably position an agitator motor.

21. In a mixing apparatus, the combination with a motor member having a vertical shaft and a casing, said shaft extending downwardly beyond the casing and carrying an agitating member, of a stand for said motor member having a motor member positioning part, and a receptacle supporting part, said motor member positioning part being adjustable relatively to said receptacle supporting part to adjust the position of said agitating member in the receptacle, and said motor member being held against lateral displacement on said positioning part, but freely movable therefrom in an upward direction.

22. In a mixing apparatus, the combination with a motor member having a vertical shaft and a casing, said shaft extending downwardly beyond the casing, and carrying an agitating member, of a stand for said motor member having a motor member positioning bracket part, a receptacle supporting part and a member adjustably interconnecting said parts, said motor member being freely detachable in an upward direction from said motor member positioning part without disturbing the adjustment of the latter relatively to said receptacle supporting part.

23. In a mixing apparatus, the combination with a motor member having a vertical shaft and a casing, said shaft extending downwardly beyond the casing and carrying a beating element, of a stand for said motor member having a motor member positioning part, a receptacle supporting part having a dished out portion for assisting in centering the receptacle with respect to the beating element, and a member adjustably interconnecting said last-named parts whereby said beating element may be adjusted vertically and laterally relatively to the receptacle, said motor member positioning part having provision for limiting the turning movement of said motor member, but the latter being freely movable from said motor member positioning part in a vertical direction without disturbing the adjustment of the said motor member positioning part.

24. In a mixing apparatus, the combination with a motor member, having a vertical shaft and a casing, said shaft extending downwardly beyond the casing and carrying a beating element, and a laterally extending handle on said motor member, of a stand for said motor member having a motor member positioning part, a receptacle supporting part, and means adjustably interconnecting said last-mentioned parts so that the beating element is adjustable vertically and laterally relatively to the receptacle, said motor member positioning part having provision for preventing turning movement of the motor member on its axis, but said motor member being freely liftable by said handle from said motor member positioning part, without disturbing the adjustment of the latter relatively to said receptacle supporting part.

25. In a mixing apparatus, the combination with a motor member, having a vertical shaft and a casing, said shaft extending downwardly beyond the casing and carrying a beating element, of a base provided with an upper face dished out to assist in centralizing a receptacle thereon with respect to the beating element, and means secured to said base for supporting the motor member above the base, said means including an adjustable bracket having engagement with said motor member to prevent it from turning but to permit it to be freely lifted from the bracket.

26. A household mixing device or the like comprising a support for a receptacle, an upright member secured to said support and arranged at one side of said receptacle, a supporting device adjustably mounted for vertical and lateral adjusting movements on said upright member at an elevation above the top of said receptacle, whereby said receptacle may be placed on said support and removed therefrom with one hand without interference by said upright member or said supporting device, an electric motor member having a part cooperating with said supporting device to position said motor member removably when said member is lowered into cooperation with said supporting device whereby said motor member may be positioned centrally above said receptacle and freely lifted therefrom, independently of said supporting device, said supporting device and said motor member engaging each other to prevent turning movement of said motor member when in operative position, and an agitator depending from said motor member into said receptacle to stir the contents thereof when said motor member and receptacle are in operative relation to each other.

27. A mixer or similar device comprising a support for a receptacle, an upright member detachably secured to said support and arranged at one side of said receptacle, an adjustable supporting device extending laterally from said upright member at an elevation above the top of said receptacle, an electric motor member having a handle and also provided with a part cooperating with said supporting device to position said motor member centrally above said receptacle when said motor member is lowered onto said supporting device with said motor member in a predetermined angular relation with respect thereto, said supporting device and said motor member having cooperating non-rotative means of engagement including an opening in one element and an opening-engaging projection on the other to thereby hold said motor member against turning, and an agitator depending from said motor member into said receptacle to stir the contents thereof when said motor member and receptacle are in operative relation to each other, said motor member being freely disengageable from said supporting device to permit removal of said agitator from said receptacle.

28. In a mixing device, the combination with an electric motor member having a casing, a handle, and a shaft extending downwardly from the casing and carrying at its lower end an agitating element, of a knockdown stand for said motor member having a receptacle supporting base member, a bar detachably secured to said base member and rising therefrom, a bracket carried on and movable with respect to said bar, means for fixing said bracket in any one of a number of different positions on said bar, and means associated with said bracket for receiving said motor member when lowered onto the bracket and supporting it with its casing above the receptacle in a position in which it is held against turning movement in a horizontal plane but is free for lifting movement from the bracket by said handle, whereby the agitating element can be removed and replaced in the receptacle in the same relative position without disturbing the adjusted position of said bracket on said bar.

29. In a mixing apparatus, a motor driven beating element, a base upon which a receptacle may be received and centered with respect to the element, and vertically and laterally adjustable positioning means connected to the base for adjustably supporting and positioning said motor driven beating element relatively to said base, said motor driven beating element being freely movable away from the base while said supporting means is maintained in its adjusted position.

30. In a mixing apparatus, a motor driven beating element, a base provided with means for positioning a receptacle thereon, and vertically and laterally adjustable positioning means connected to the base for adjustably supporting and positioning said motor driven beating element relatively to said base at a desired depth in and concentric to the receptacle, said motor driven beating element being freely movable away from the base in a vertical direction while the supporting means is maintained in its adjusted position.

31. In a mixing apparatus, the combination with a motor member having a vertical shaft and a casing, said shaft extending downwardly beyond the casing and carrying a beating element, of a base acting as a support for a receptacle containing the material to be mixed, and means secured to said base for supporting said motor member above said receptacle, including an adjustable bracket part engaging a part of the motor member to position said motor member vertically and laterally with respect to the base and hold it against angular displacement, and from which bracket part said motor member is readily removable.

In witness whereof, I have hereunto set my hand this 2d day of February, 1926.

ALFRED C. GILBERT.